United States Patent [19]

Hirose et al.

[11] 4,321,618
[45] Mar. 23, 1982

[54] REPRODUCING SYSTEM FOR VIDEO TAPE RECORDERS

[75] Inventors: Koichi Hirose; Akira Shibata, both of Katsuta, Japan

[73] Assignee: Hitachi, Ltd., Tokyo, Japan

[21] Appl. No.: 58,625

[22] Filed: Jul. 18, 1979

[30] Foreign Application Priority Data

Jul. 19, 1978 [JP] Japan ................................. 53-87187

[51] Int. Cl.³ .......................... H04N 5/76; H04N 5/78
[52] U.S. Cl. ........................................... 358/8; 360/38
[58] Field of Search ........................ 358/4, 8, 39, 27; 360/38; 330/141, 281

[56] References Cited

U.S. PATENT DOCUMENTS

| | | | |
|---|---|---|---|
| 3,620,631 | 11/1971 | Stopka | 330/281 X |
| 3,679,814 | 7/1972 | Barclay | 358/8 |
| 3,709,896 | 2/1974 | Shimizu et al. | 330/281 |
| 3,949,414 | 4/1976 | Hayashi | 358/8 |
| 4,007,485 | 2/1977 | Sato | 358/8 |
| 4,064,537 | 12/1977 | Ota et al. | 360/38 X |
| 4,068,256 | 1/1978 | Tsuchiya et al. | 358/4 |
| 4,068,257 | 1/1978 | Hirota et al. | 358/4 |
| 4,165,495 | 8/1979 | Takahashi | 358/8 X |
| 4,177,481 | 12/1979 | Yamagiwa et al. | 358/8 |

Primary Examiner—Aristotelis M. Psitos
Attorney, Agent, or Firm—Craig and Antonelli

[57] ABSTRACT

A plurality of signals picked up by a plurality of video heads are amplified by a plurality of amplifiers and then are fed to a plurality of switch circuits where the signals are alternately switched. The signals from the switch circuits are coupled by a coupling line into a continuous signal which in turn is fed to an automatic gain control circuit. The automatic gain control circuit provides at its output an FM output signal with a constant level. A color signal is taken from a portion between the coupling line and the automatic gain control circuit.

4 Claims, 7 Drawing Figures

REPRODUCING SYSTEM FOR VIDEO TAPE RECORDERS

BACKGROUND OF THE INVENTION

The present invention relates to a reproducing system for video tape recorders and, more particularly, to a reproducing system for video tape recorders where a plurality of reproduced video signals sequentially reproduced by a plurality of video heads are alternately switched to produce a continuous reproduced video signal.

Generally, a home-use video tape recorder of the two rotary head type is provided with a disc having two video heads disposed on the periphery thereof with an angular separation of 180°. The disc is rotatably disposed within a slit of a cylinder with a slightly larger diameter than that of the disc so that the head chips of the two video heads project outwardly from the outer periphery of the cylinder. A magnetic tape is wound around the cylinder, lapping the outer wall of the cylinder over a range of 180° or more in a Ω-shaped fashion. The disc is rotated at a speed of 30 rotations per second while the magnetic tape is transported at a constant speed in an opposite direction to the rotating direction of the disc, slanting with respect to the slit of the cylinder. In this way, the two video heads alternately record onefield video signals of each picture on the magnetic tape in slant recording tracks during each 1/60 second, so that the video signal recorded on each slant recording track has its both end portions overlaped with end portions of the signals recorded on the adjacent slant recording tracks. Use is made of a servo system for making the phase of the vertical synchronizing signal concurrent with the rotation phase of the video heads in order that the vertical synchronizing signal included in the video signal is recorded on the overlapping portions of the tracks.

In reproducing the video signals, the two video heads alternately and accurately trace the corresponding tracks on the magnetic tape to pick up the video signals recorded thereon. The signals picked up are amplified by their associated preamplifiers to form reproduced channel signals which are fed to corresponding channel switch circuits where the channel signals are subjected to a switching control at the overlapping portions at every 1/60 second. A series of continually reproduced video signals each for one field produced from the switch circuits are then coupled by partial superposition to be a continuous video signal. The video signal includes an FM signal and a color signal. The FM signal is a signal of 3.4 to 4.4 MHz frequency-modulated with a brightness signal of 0 to 4 MHz while the color signal is a signal of 629 KHz which is a conversion from a chromaticity representing signal of 3.58 MHz.

As described above, the home-use video tape recorder uses two video heads to alternately reproduce the video signals. However, since there exist inherently some variations in the level of signals reproduced by a video head when two heads are used in combination, the level variation is more likely to occur, which may cause undesirable phenomena such as, for example, flicker.

For this reason, in the conventional system, the outputs from the channel switch circuits are not directly summed but summed by using an adder including a variable resistor. Specifically, both fixed ends of the variable resistor are connected as input terminals to the output terminals of the two channel switch circuits and the movable terminal of the variable resistor is used as an output terminal. The movable terminal is manually operated to change the resistance ratio in order that the levels of output signals, particularly FM signals, from the video heads are adjusted to be made equal to each other. Through this adjustment, the channel level difference between the two video heads are adjusted and then the reproduced FM signal is applied to an amplifier at the next stage where it is properly amplified to have a proper level. The FM signal with the proper level is supplied to a level adjustor to adjust the level of the FM signal to be inputted to a dropout compensating circuit at the next stage. The dropout compensating circuit is used for compensating for a dropout possibly occuring in the video signal. The level for the dropout is generally selected to be the one approximate to −20 dB of an ordinary average reproduced level. Therefore, if the reproduced FM output changes, the dropout level also changes correspondingly. When this change of the level of the reproduced FM signal is large, even a slight level reduction operates the dropout compensating circuit so that the switching noise is rather conspicuous. On the other hand, when it is small, the dropout compensation is almost ineffective. It is for this reason that the reproduced FM output level is kept constant by the level adjustor. Meanwhile, the color signal is taken out from a succeeding stage to the adder, i.e. to the channel balance resistor, through a low-pass filter. The color signal is controlled to have always a constant level by an automatic color level control circuit (ACC circuit) connected at a succeeding stage. Accordingly, the color signal suffers from no problem in particular.

As described above, conventionally, the channel balance and the level adjustments are manually performed, taking a relatively long time, which is a disadvantage. Further, these two adjustments are made to be settled at an optimum point of the reproduction system used. Therefore, when a magnetic tape recorded by another system is used for reproduction by this reproducing system, which has been previously adjusted (such a reproduction being called an interchanged reproduction), variations of channel levels and the reproduced FM output levels may take place or the dropout compensation may be unstable, resulting in deterioration of picture quality.

Further, since a variable resistor is used for the two adjustments, when the reproducing system is fabricated as an IC, the resistor cannot be assembled into the IC, that is, the resistor must be used separately from the IC. Therefore, the IC needs additional pins to connect the resistor.

SUMMARY OF THE INVENTION

Accordingly, an object of the present invention is to provide a reproducing system for video tape recorders which suppresses the above-mentioned disadvantages and automatically adjusts level variations among a plurality of channels thereby to make the reproduced FM output level constant, and needs a less number of pins when it is fabricated as an IC.

To this end, in accordance with the present invention, the reproduced output levels from two video heads are directly coupled and an automatic gain control circuit is provided in a common signal path, thereby to make constant the level of an FM signal appearing at the output. A color signal is taken out from a stage preceding the automatic gain control circuit.

DESCRIPTION OF THE PREFERRED EMBODIMENT

Figure 1:
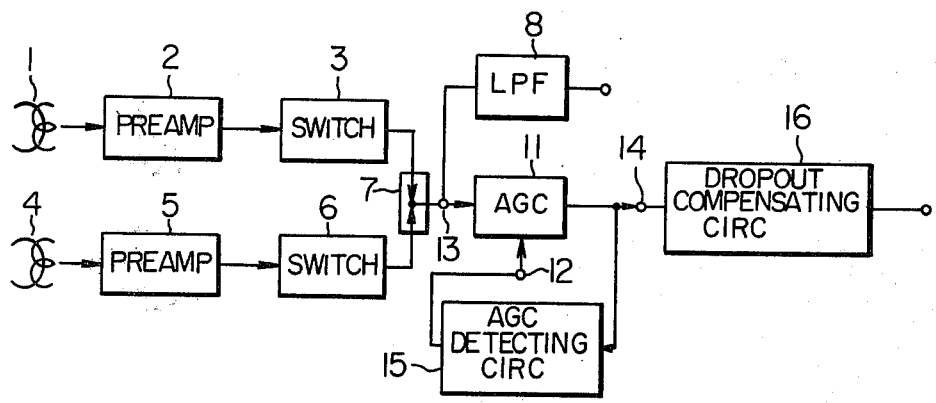
FIG. 1 is a block diagram of an embodiment of the present invention.
Figure 2A:
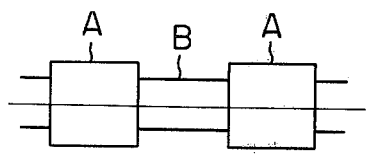
FIGS. 2a and 2b are waveform diagrams concerning FIG. 1.
Figure 2B:
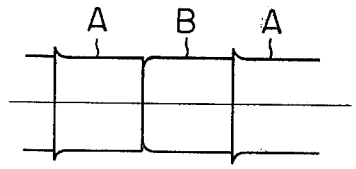
Figure 2B:
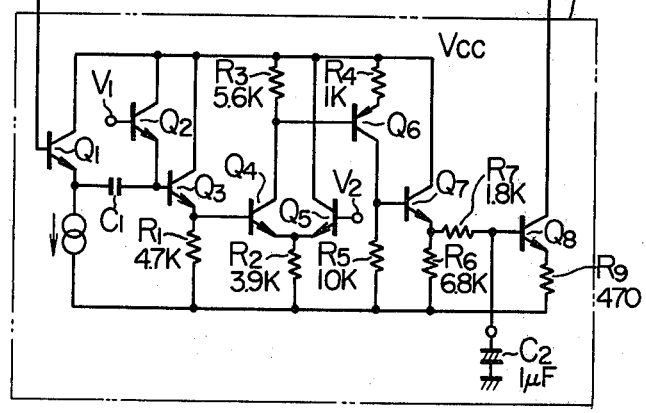

Reference is now made to FIG. 1 illustrating in block form an embodiment of a reproducing system for a video tape recorder according to the invention. A signal reproduced by a video head 1 is amplified by a pre-amplifier 2 to have a proper level. Similarly, a signal reproduced by another video head 4 is amplified by another pre-amplifier 5. The respective signals, after passing the corresponding amplifiers 2 and 5, are alternately switched by switches 3 and 6 and then are fed to a coupling line 7 where these signals are coupled so as to form a continuous signal which in turn is applied to an input terminal 13 of an automatic gain control (AGC) circuit 11. An output terminal 14 of the AGC circuit 11 is connected to an input terminal of a dropout compensating circuit 16 and to an input terminal of an AGC detecting circuit 15 of which the output is applied to a control terminal 12 of the AGC circuit 11. The gain of the AGC circuit 11 is changed depending on a DC voltage supplied from the control terminal 12. The AGC detecting circuit 15 produces a DC voltage depending on the signal amplitude level of a signal derived from the AGC output terminal 14. When the amplitude level is high, the circuit 15 produces a DC voltage to reduce the gain of the AGC circuit 11 while when the amplitude level is low, it produces a DC voltage to raise the level. As a result, even if the level of the reproduced signal applied to the input terminal 13 changes, the signal appearing at the output terminal 14 is substantially constant. FIGS. 2a and 2b show envelope waveforms of signals appearing at the AGC input terminal 13 and the AGC output terminal 14. When reproduced signals A and B at different levels for respective channels, as shown in FIG. 2a, are applied to the AGC input terminal 13, the above-mentioned AGC operation provides output voltages of which the levels are almost equal and constant for the respective channels, as shown in FIG. 2b. At the point in time where the signal level is switched, some level changes are observed arising from the time constant of the AGC detection circuit 15. However, the level changes may satisfactorily be reduced by properly selecting the control sensitivity of the AGC circuit 11. In addition, these level changes appear within the vertical blanking period so that some degree of level variation does not deteriorate the reproduced picture. Therefore, the level change is not problematic.

As can be seen from the foregoing description, the provision of the AGC circuit in the reproduced FM signal path eliminates or remarkably suppresses variations of the reproduced FM signal among channels and further makes constant the levels of the reproduced FM output signals. As a result, the dropout level in the dropout compensating circuit can also be kept at a constant level.

Meanwhile, the low frequency converted color signal is almost not related to the level of the reproduced FM signal. The AGC circuit detects the level of the reproduced FM signal to make the output level constant, as mentioned above. For this, the reproduced color signal included in the signal appearing at the output terminal 14 of the AGC circuit 11 is influenced by the levels of the FM signal from the reproducing head and the reproduced envelope, which result is an increase of the level variation among the channels. Therefore, the reproduced color signal must be taken out from a stage preceding the AGC circuit 11. In the circuit shown in FIG. 1, the color signal is taken out from the input terminal 13, for example, of the AGC circuit 11, through a low-pass filter 8.

Figure 3:
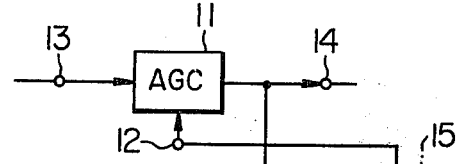
FIG. 3 is a circuit diagram of an example of the AGC circuit shown in FIG. 1.

Turning now to FIG. 3, there is shown a circuit diagram of an example of the AGC detecting circuit 15. An AGC output signal is applied to a buffer amplifier comprised of a transistor $Q_1$. The output signal from the transistor $Q_1$ is applied to a clamp circuit including a capacitor $C_1$ and transistors $Q_2$ and $Q_3$ where the lower limit of the output signal is clamped to a voltage $(V_1 - V_{BE})$, where $V_1$ denotes a base voltage of the transistor $Q_2$ and $V_{BE}$ denotes a voltage between the base and emitter of the transistor $Q_3$. The clamped signal is then applied to a differential amplifier including transistors $Q_4$ and $Q_5$, through a buffer amplifier constituted by the transistor $Q_3$. The base voltage $V_2$ of the transistor $Q_5$ and the base voltage $V_1$ of the transistor $Q_2$ are selected so as to have a proper potential difference $(V_2 - V_1)$. If these are so selected, when the amplitude of an input signal $V_a$ to the detecting circuit becomes approximately $(V_2 - V_1 + 2V_{BE})$, the transistor $Q_4$ becomes conductive so that the input signal is amplified by the transistor $Q_6$ and is applied through a buffer amplifier constituted by a transistor $Q_7$ to a low-pass filter including a resistor $R_7$ and a capacitor $C_2$ where an AC component of the input signal is removed, and is finally applied to the base of a transistor $Q_8$. The voltage at the base of the transistor $Q_8$, when changing, changes the collector current of the same transistor. The changed collector current reaches the control terminal 12 of the AGC circuit 11 to control the gain of the AGC circuit 11. In this case, when the amplitude of the signal supplied to the transistor $Q_1$ becomes large, the collector current of the transistor $Q_4$ also becomes large and the base voltage of the transistor $Q_8$ is raised so that its collector current increases to reduce the gain of the AGC circuit 11. Inversely, when the amplitude of the input signal to the transistor $Q_1$ becomes small, the collector current of the transistor $Q_8$ is reduced to increase the gain of the AGC circuit. The level of the signal at the output terminal 14 of the AGC circuit 11 may be selected to be a proper level, for example 1.5 V, depending on the bias voltages $V_1$ and $V_2$.

When the amplitude of the signal at the input terminal 13 of the AGC circuit 11 becomes large, the base voltage of the transistor $Q_7$ tends to rise. Accordingly, the time constant at this time is $R_7 \times C_2$. On the other hand, when the amplitude of the signal at the input terminal 13 of the AGC circuit 11 becomes small, the base voltage of the transistor $Q_7$ tends to fall. Accordingly, the time constant at this time is $(R_6 + R_7) \times C_2$.

Figure 4A:
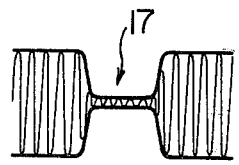
FIGS. 4a to 4c are waveform diagrams illustrating a dropout.
Figure 4B:
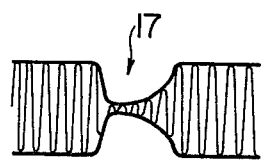
Figure 4C:
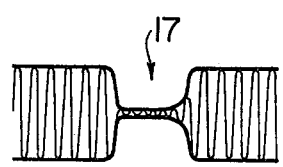

In order to rapidly eliminate the level difference among the channels, the time constant of the AGC circuit is preferably small. An excessively small time constant, however, fails to stably compensate for a long dropout. This will be explained with reference to FIGS. 4a to 4c. These figures show reproduced signal envelopes with a dropout. FIG. 4a shows an AGC input waveform, and FIGS. 4b and 4c show AGC output waveforms. A dropout denoted by 17 is usually very short and is not longer than one horizontal scanning time period (referred to as 1H hereinafter). In the case of a video tape extremely scratched, the dropout may be as long as several H. At this time, if the time constant is too small, the signal level during the dropout period gradually increases as shown in FIG. 4b. The dropout detecting circuit 15 does not treat such shaped dropout portion as a dropout thereby to fail to make a stable compensation of the dropout. However, if the time constant of the AGC circuit is selected such that the level difference shown in FIG. 2a is eliminated within the vertical blanking period, as shown in FIG. 2b, the level difference never appears in the television picture, and at the same time, the waveform at the dropout portion is much the same as that of the input signal so that the dropout continuing over several H may stably be corrected.

With respect to the response of the AGC circuit, its time constant at the time when the signal level goes from low to high may be different from that at the time when the signal level goes from high to low, by properly designing the AGC detecting circuit 15. That is to say, the time constant may be set small when the level goes high while it may be set large when the level goes low. If the time constant is so set, the elimination of the dropout and the compensation for the dropout are further improved.

As described above, in the embodiment shown in FIG. 3, the different time constants are employed for the level going high and for the level going low. Specifically, by properly selecting the values of the resistors $R_6$ and $R_7$, the AGC circuit response can be made fast when the input amplitude to the AGC circuit becomes large (the signal level changing from B to A in FIG. 2a), and can be made slow when the input amplitude becomes small (the signal level changing from A to B in FIG. 2a). In the embodiment shown in FIG. 3, the time constant ratio is selected to be approximately 4.8.

We claim:

1. A reproducing system for video tape recorders comprising:
   amplifier means for amplifying a plurality of signals picked up by a plurality of video heads, respectively, each signal containing a luminance portion and a chrominance portion;
   switching means connected to said amplifier means for alternately conducting said plurality of signals directly to a coupling line on which is formed a continuous signal from said plurality of signals on a common signal path;
   an automatic gain control circuit having its input connected to said coupling line for reception of the luminance portion of said continuous signal;
   a color signal extracting circuit connected to said coupling line for extracting said chrominance portion from said continuous signal prior to application of said luminance portion to said automatic gain control circuit; and
   circuit means connected to said automatic gain control circuit for detecting and adjusting the level of the output of said automatic gain control circuit, whereby a constant FM output level is taken out from the output of said automatic gain control circuit.

2. A reproducing system for video tape recorders comprising:
   amplifier means for amplifying a plurality of signals picked up by a plurality of video heads, respectively, each signal containing a luminance portion and a chrominance portion;
   switching means connected to said amplifier means for alternately conducting said plurality of signals directly to a coupling line on which is formed a continuous signal from said plurality of signals on a common signal path;
   an automatic gain control circuit having its input terminal connected to said coupling line for reception of the luminance portion of said continuous signal;
   a dropout compensating circuit having its input connected to an output terminal of said automatic gain control circuit;
   an automatic gain control detecting circuit having its input connected to the output terminal of said automatic gain control circuit and its output connected to a control terminal of said automatic gain control circuit; and
   a color signal extracting filter connected to said coupling line for extracting said chrominance portion from said continuous signal prior to application of said luminance portion to said automatic gain control circuit, whereby a constant FM output level is supplied to said dropout compensating circuit.

3. A reproducing system for video tape recorders according to claim 2, in which said automatic gain control detecting circuit includes a time constant circuit for eliminating a level difference among video signals picked up by the plurality of video heads, and the time constant of said time constant circuit is not shorter than about one horizontal scanning time period and is such that elimination of the level difference is finished within a vertical blanking time period of the video signal.

4. A reproducing system for video tape recorders according to claim 2, in which said automatic gain control detecting circuit includes a time constant circuit for eliminating a level difference among video signals picked up by the plurality of video heads, including means responsive to changes in said video signal from a low level to a high level with a relatively-small time constant while responding to video signal changes from a high level to a low level with a relatively-large time constant.

* * * * *